Oct. 22, 1940.  J. L. ANDERSON  2,218,570
METHOD OF WELDING
Filed July 17, 1936
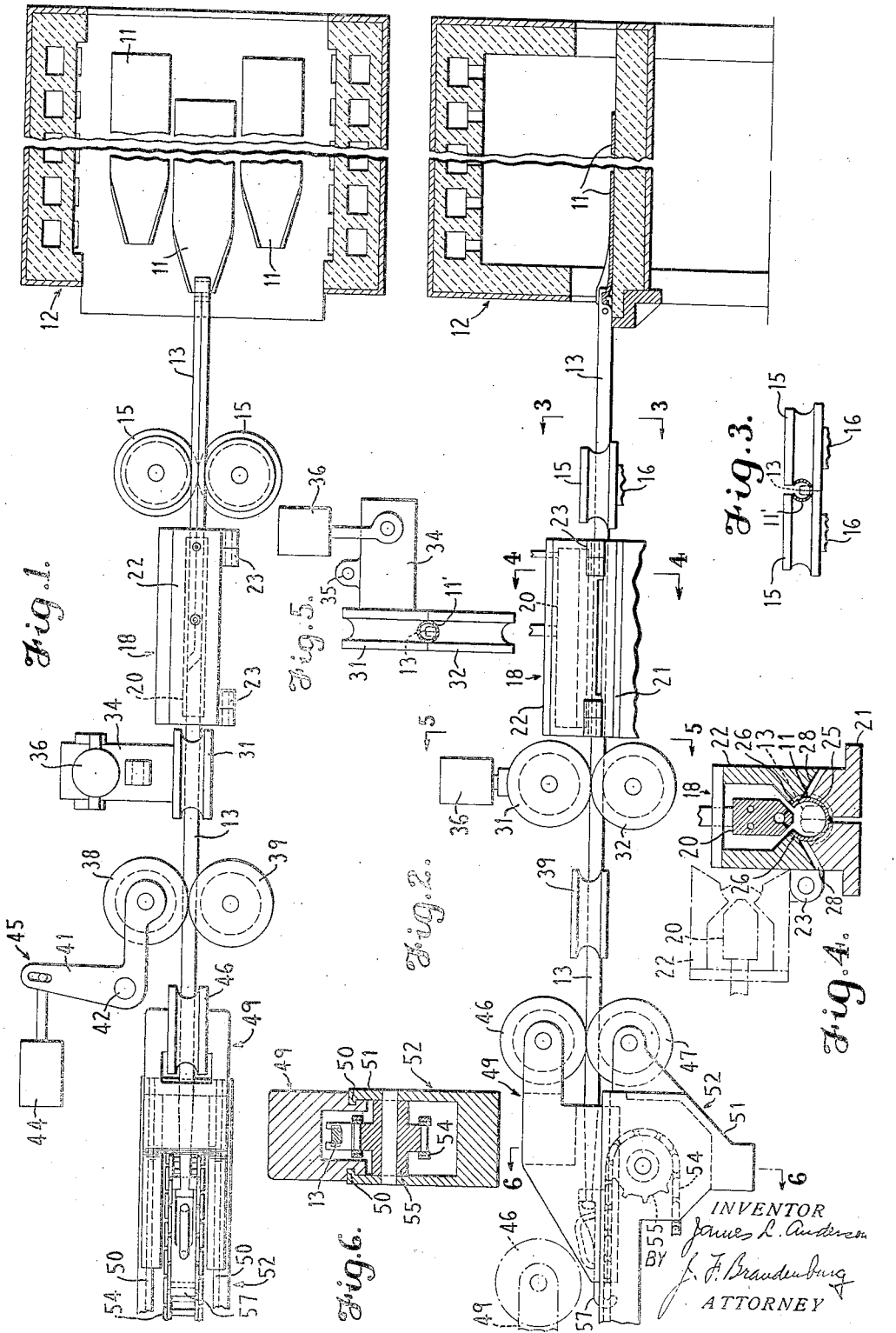
INVENTOR
James L. Anderson
BY
J. F. Brandenburg
ATTORNEY Patented Oct. 22, 1940

2,218,570

UNITED STATES PATENT OFFICE 2,218,570

METHOD OF WELDING

James L. Anderson, Closter, N. J., assignor to Air Reduction Company, Incorporated, New York, N. Y., a corporation of New York Application July 17, 1936, Serial No. 91,211

6 Claims. (Cl. 113—112)

This invention relates to methods of making welded pipe and tubing from flat or partially formed skelp, and especially from high carbon or alloy steel skelp.

In the manufacture of welded pipe and tubing by pulling heated skelp through a die or other means which bends the metal to tubular form and brings the seam edges together to make the weld, the forming and closing of the pipe or tube is usually performed in a stationary die. The skelp is heated in a furnace to a temperature high enough to cause the edges to weld when brought together, or heated in the furnace to a somewhat lower temperature which is raised locally by air-blasting the edges as they move toward the closing die.

Such methods of making welded pipe and tubing have not been practical with high carbon and alloy steel skelps, which can not be highly heated in the furnace without deterioration. Even with the air-blast methods the skelp must be heated in the furnace to a temperature above the kindling point of the metal in order to make the air blast effective, and such a degree of furnace heating is injurious to certain kinds of steel skelps, and the burning of the edges is detrimental to the weld quality.

Among the objects of this invention are to provide an improved method of making welded tubes, and to provide a simple and reliable method with which welded tubes can be made from high carbon and alloy steel skelp which is subject to deterioration if heated in a furnace to a temperature high enough for welding. The term "tube" is used herein to mean both pipe and tubing.

In accordance with this invention skelp is heated in a furnace to a temperature below that at which the metal is likely to deteriorate or lose desirable physical characteristics, and the edges are then prepared for welding by applying intense heat directly to the edge faces to cause a surface fusion of the edges quickly without overheating the body of the skelp. In its broadest aspects the invention is not limited to furnace heating, but with cold skelp the cost of making tubes is considerably higher because the edge heating is more expensive than furnace heating and the output of the apparatus is less when the skelp has had no preliminary heating.

Another object of the invention is to provide a method for making welded tubes from stainless steel or other kinds of skelp without scratching the outside surface of the tubes. In the bell-weld methods of the prior art, the skelp is so highly heated that when pulled from the furnace it is covered with a liquor of molten slag or oxides which acts as a lubricant for the metal as it passes through the bell or other closing die. Stainless steel and many other kinds of skelp can not be safely heated to a temperature high enough to produce a liquor coating.

One feature of this invention involves the forming and welding of the tube in rolls instead of a stationary die and at much lower temperatures than have been used in known welding methods. Even though the skelp is stiffer at these lower temperatures and even thought it is not covered with liquor, the rolls eliminate substantially all of the usual friction between the skelp and the welding apparatus so that the surface of the tube is not scratched and the skelp will withstand the stress required to draw it through the rolls while forming.

Other objects, features and advantages of the invention will appear or be pointed out as the specification proceeds.

In the accompanying drawing, forming part hereof:

Fig. 1 is a top plan view, partly in section, showing apparatus for making welded tubes in accordance with this invention;

Fig. 2 is a side elevation of the apparatus illustrated in Fig. 1, with the same part shown in section; and Figs. 3–6 are sectional views taken on the lines 3—3 to 6—6, respectively, of Fig. 2, but with Fig. 4 on a slightly larger scale and with the skelp passing through the apparatus in Figs. 3–5.

Strips of high carbon or alloy steel skelp 11 are heated in a furnace 12. The skelps are preferably put into the furnace at different times so that they reach the desired temperature for withdrawal at successive times. The skelp is pulled from the furnace by tongs 13 which have one very long handle but are otherwise of conventional construction.

The skelp is drawn from the furnace at a temperature below that which will produce a change in the composition of the metal, such as the burning out of the carbon of high carbon steel or other objectionable changes in the skelp. The permissible heating will depend upon the composition of the skelp, but the invention contemplates withdrawing the skelp from the furnace at moderate temperatures where a slight change in color gives the welder his only indication of the temperature. In prior art practice it has been usual for the welder to watch for changes of the skelp surface, such as the appearance of molten oxides, as an indication that the skelp has reached the temperature at which it should be withdrawn from the furnace.

With high carbon and alloy steels which must be pulled from the furnace before reaching a temperature which causes molten oxide to appear, it is possible to gauge the heating by some change in color, by an optical pyrometer, or other temperature measuring device. Although the skelp can be taken from the furnace at various temperatures over a wide range, it is essential that there should not be too much difference in the temperatures of successive skelps.

For example, the welder may choose to pull the skelp from the furnace at a relatively low temperature, and this is satisfactory if the speed of the skelp through the subsequent edge heating means is reduced to compensate for the lack of furnace heating. The temperature at which the skelp is drawn from the furnace must be properly related to the speed at which it passes through the welding apparatus.

The skelp is drawn from the furnace into a forming roll pass between two rolls 15, which turn on vertical axes and have their upper edges spaced apart far enough to permit the tongs to pass between these edges when the welder is lowering the tongs into horizontal position after gripping a skelp.

Fig. 3 shows the skelp bent into a partially formed tube, which is indicated by the reference character 11'. The position of the tongs 13 when initially pulling the skelp into the pass between the rolls 15 is shown in dotted lines in this view. The rolls 15 have axles 16 which are generally parallel and set in a fixed relation with one another, though this relation may be adjustable in accordance with the usual construction of forming roll stands.

Beyond the forming rolls 15, the partially formed tube 11' passes through a retort 18 in which heating agencies such as flames are projected directly against the edge faces, and these flames are so intensely hot that the edge faces are brought to a state of surface fusion before much heat can travel back from the edges of the partially formed tube. When the flames are said to be projected directly against the edge faces in this description and in the claims, it is meant that the flame jets flow in directions that intersect the surfaces of the edges and are in such relation to the edge faces that they distribute heat substantially uniformly over the surfaces by direct contact of the hot gases with the surfaces.

Fig. 4 shows the preferred construction of the retort 18. The edge faces of the partially formed tube are heated by a torch 20 having two or more rows of jet orifices in positions to direct flames against the respective edge faces. By projecting oxyacetylene flames from the torch 20, the edge faces are heated quickly and at the same time protected from contact with the air by the voluminous envelope gases which are produced by the primary combustion of oxyacetylene flames.

Some heating of the body of the partially formed tube in the retort 18 is unavoidable and is in fact desirable. The envelope gases or products of combustion of the flame jets which would otherwise be wasted can be utilized to partially heat the body of the partially formed tube 11' and reduce the conduction losses from the edge faces. This heating by the envelope gases in the retort permits the skelp to be drawn from the furnace at a lower temperature, and in fact reduces the maximum temperature to which the skelp need be heated in the furnace.

The retort 18 includes a fixed lower section 21 and an upper section 22 which is joined to the lower section by hinges 23. This construction permits the retort to open to admit the tongs 13. The torch 20 is carried by the upper section of the retort and moves with that section when the retort is opened into the dotted-line position shown in Fig. 4.

When the retort 18 is closed, the inside surfaces 25, 26 of the upper and lower sections 21 and 22 register at their edges and comprise a guide surface for the partially formed skelp 11'. The guide surfaces 25, 26 are preferably grooved to permit the products of combustion or envelope gases from the flame jets to flow across the outside surface of the skelp. Air for the combustion of the envelope gases is aspirated or introduced into the retort around the sides of the torch 20, and the products of combustion escape from the retort 18 through exhaust ports 28.

If the skelp is partially formed before being put in the furnace, the retort 18 can be placed nearer the furnace and the rolls 15 dispensed with, but it is usually advantageous to heat flat skelp and do all the forming in one continuous operation.

Immediately beyond the retort 18 is a "welding" roll stand including an upper roll 31 and a lower roll 32. Each of these rolls has a concave face, and they complete the forming of the skelp and bring the surface-fused edges together to make the weld. The completed tube is shown in the welding roll pass in Fig. 5 and indicated by the reference character 11''.

The upper roll 31 can be moved away from the lower roll 32 to provide space for the tongs 13 to be placed between the rolls, after which the upper roll is returned to working position, where it forms with the lower roll 32 a substantially circular roll pass.

Mechanism for moving the upper roll 31 toward and from the lower roll 32 is shown diagrammatically in Fig. 5. The axle of the roll 31 is carried by a support 34, which can be rocked about a fixed pivot 35 by a fluid motor 36.

There may be one or more sizing roll passes beyond the welding rolls 31 and 32. Two sets of sizing rolls are shown in the drawing. The first of these includes rolls 38 and 39 which turn on vertical axes. Means are provided for moving the roll 38 away from the roll 39, to permit the tongs to be placed between the rolls, and then moving the roll 38 back into its working relation with the roll 39. Such means are shown diagrammatically in Fig. 1 and include a bell crank 41 which supports the axle of the roll 38 and which is rocked about a fixed pivot 42 by a fluid motor 44. This motor operates the bell crank 41 through a pin and slot connection 45.

The final sizing roll stand includes a novel construction for moving an upper roll 46 away from a lower roll 47 to permit the tongs 13 to be placed on the lower roll preparatory to their connection with the drawbench chain. The lower roll 47 turns about a fixed axis, but the axle of the upper roll 46 is carried by a support 49 which slides along an undercut track 50 on a frame 51 of a drawbench 52. The support 49 can be moved along the drawbench frame to shift the upper roll 46 into the dotted line position shown in Fig. 2, where it is beyond the end of the tongs 13 and can not interfere with the movement of the tongs when the welder is placing them in a horizontal position after having closed them to grip the skelp.

When the tongs 13 have been put in the position shown in Fig. 2, the support 49 and roll 46 are shifted back into the full-line position in which they form the final sizing pass for the welded tube.

The drawbench 52 has a chain 54 which runs over a sprocket 55. A hand dog 57 is connected with the end of the tongs and then hooked into the chain 54 to cause the tongs to move with the chain and pull the skelp from the furnace and into the various roll passes and the retort 18.

After each length of skelp has been pulled through the apparatus and made into a welded tube, the support 49 and roll 46 are shifted into their dotted-line position, the rolls 38 and 31 moved away from their cooperating rolls, and the retort 18 opened into the dotted-line position shown in Fig. 4, so that the welder after gripping a new skelp with the tongs can lower them into a horizontal position ready for connection with the drawbench chain. The welder then returns the rolls and torch to their working positions, connects the dog 57 to the tongs, and hooks it into the drawbench chain to start the next skelp through the apparatus.

Although the welding described has been for high carbon and alloy steel, and while an important advantage of the invention is its ability to make satisfactory welds at high speed with such skelp, it will be understood that the method and apparatus described can be used with other kinds of skelp and that some features of the invention can be used without others.

I claim:

1. The method of making tubes from high carbon or alloy steel skelp which is subject to permanent change in composition if heated in a furnace to a welding temperature, which method comprises heating the body of the skelp to less than welding temperature and to a temperature less than that at which a liquor forms on the surface of the metal, partially forming the heated skelp by force applied by rolling contact with the surface of the skelp to avoid scratching the surface of the metal, heating the edge faces of the partially-formed skelp by projecting oxy-hydrocarbon fuel gas heating flames directly against the edge faces to heat said edge faces to a welding temperature while protecting the metal of the edge faces from the atmosphere by reducing envelope gases from said heating flames, and completing the forming of the tube by bringing the edge faces together immediately after said edge faces are heated to a welding temperature.

2. The method of making welded tubes from skelp which is subject to deterioration if heated in a furnace atmosphere to a welding temperature, which method comprises projecting heating flames directly against the edge faces and with said flames of such high intensity that the surfaces of the skelp edges are heated sufficiently for welding and the heating accomplished so quickly that metal behind the heated surface layer does not rise to a temperature high enough to cause deterioration of the metal, and forming the tube in such a manner that the edge faces are brought together to make the weld immediately upon reaching a suitable temperature and before any substantial quantity of heat is conducted into the body of the skelp from the edge faces.

3. The method of making welded tubes from high carbon and alloy steel skelp from which carbon, or other consequential elements are burned out at temperatures lower than welding temperature, which method comprises heating the entire body of the skelp to less than welding temperature, bending the skelp into a partially formed tube with separated edge faces, and then progressively heating the separated edge faces of the skelp by projecting directly against said faces heating flames of such intensity that the edge faces are brought to a condition of surface fusion before the metal behind the surface layer is brought to a composition-changing temperature by the conduction of heat from the edge faces, and passing the skelp through forming and welding rolls which complete the forming of the tube and bring the edge faces together to make the weld.

4. The method of making welded tubes from high carbon and alloy steel skelp which is subject to permanent deterioration when heated in a furnace to a welding condition, which method comprises heating the entire body of a skelp in a furnace to a temperature substantially below that at which said permanent deterioration occurs, bending the skelp into a partially-formed tube as the skelp comes from the furnace, and applying the bending force by rolling contact with the moving skelp, projecting heating flames directly against the edge faces of the partially-formed tube as they travel beyond the region of bending, and causing the directly applied heating flames to heat the edge faces with such intensity that the faces of the edges are raised to a welding temperature before the metal behind the surface layer is heated above the deteriorating temperature, and immediately bringing the edge faces of the partially-formed tube into contact after they reach a welding condition and before they can be cooled by the conduction of heat into the lower-temperature metal behind the surface layer.

5. The method of making welded pipe and tubing from high carbon and alloy steel skelp which undergoes permanent change in chemical composition if heated in a furnace to a welding temperature, which method comprises heating the skelp in a furnace to a temperature substantially less than welding temperature, partially forming the skelp into a tube, and heating the edge faces of the partially-formed tube by projecting heating flames directly against the edge faces with the heating flames of such intensity that they raise the surface layer of metal on the edge faces to a welding temperature with a very steep temperature gradient in the metal of the edge portions so that the metal behind the surface layer remains at a temperature substantially lower than welding temperature, doing the major part of the forming of the tube before the edge faces have been heated in the manner described, and immediately after the edge faces reach a welding temperature doing the remaining forming of the tube by bringing the edge faces together.

6. The method of making tubes from high carbon or alloy steel skelp which is subject to permanent change in composition if heated in a furnace to a welding temperature, which method comprises heating the entire body of a skelp to a temperature less than that at which liquor forms on the surface of the metal, bending the skelp while so heated into a partially-formed tube as a continuous process with the heating step and by force applied by rolling contact with the surface of the skelp to avoid scratching of the metal surface, and supplying additional heat to the edge regions of the skelp, as they come from the bending step, by projecting intense heating flames directly against the surfaces to be joined so that the surfaces are heated quickly and uniformly to a welding temperature, and bringing said surfaces together immediately after the direct flame heating, and while said surfaces are at welding temperature, to complete the tube.

JAMES L. ANDERSON.